USO11300960B2

(12) United States Patent
Kumar et al.

(10) Patent No.: US 11,300,960 B2
(45) Date of Patent: Apr. 12, 2022

(54) METHOD AND DEVICE FOR NAVIGATING AN AUTONOMOUS VEHICLE

(71) Applicant: Wipro Limited, Bangalore (IN)

(72) Inventors: Balaji Sunil Kumar, Bengaluru (IN); Manas Sarkar, Barasat (IN)

(73) Assignee: Wipro Limited, Bangalore (IN)

( * ) Notice: Subject to any disclaimer, the term of this patent is extended or adjusted under 35 U.S.C. 154(b) by 236 days.

(21) Appl. No.: 16/662,105

(22) Filed: Oct. 24, 2019

(65) Prior Publication Data

US 2020/0310437 A1    Oct. 1, 2020

(30) Foreign Application Priority Data

Mar. 27, 2019    (IN) .............................. 201941012012

(51) Int. Cl.
  G05D 1/02 (2020.01)
(52) U.S. Cl.
  CPC ......... G05D 1/0212 (2013.01); G05D 1/0268 (2013.01); *G05D 2201/0213* (2013.01)
(58) Field of Classification Search
  CPC ............... G05D 1/0212; G05D 1/0268; G05D 2201/0213
  USPC .......................................................... 701/25
  See application file for complete search history.

(56) References Cited

U.S. PATENT DOCUMENTS 10,379,538 B1* 8/2019 Sheckells ........... B60W 60/0011
10,671,075 B1* 6/2020 Kobilarov ............ G05D 1/0088
2017/0008521 A1* 1/2017 Braunstein ....... G08G 1/096725
2019/0258260 A1* 8/2019 Sunil Kumar ....... G05D 1/0274
2019/0391580 A1* 12/2019 Di Cairano ............ G06N 5/022
2020/0097016 A1* 3/2020 Zhu ...................... G05D 1/0088
2020/0180612 A1* 6/2020 Finelt .................... B60W 30/09

FOREIGN PATENT DOCUMENTS

CN    105318879 A    2/2016

OTHER PUBLICATIONS

Luettel, T., et al., "Autonomous Ground Vehicles—Concepts and a Path to the Future", IEEE Journals & Magazine, vol. 100, issue: Special Centennial Issue 2012, pp. 1-13.
Luettel, T., et al., "Autonomous Off-Road Navigation for MuCAR-3-Improving the Tentacles Approach: Integral Structures for Sensing and Motion", Springer-Verlag 2011, 6 pages.

* cited by examiner

*Primary Examiner* — Yazan A Soofi
(74) *Attorney, Agent, or Firm* — Finnegan, Henderson, Farabow, Garrett & Dunner, LLP

(57) ABSTRACT

The present invention relates to a method and device for navigating an autonomous vehicle. The autonomous vehicle generates a first trajectory based on a path of navigation and determines a current velocity and present load of the autonomous vehicle. Further, the autonomous vehicle measures a curvature of a curved segment in the first trajectory and matches the measured curvature of the curved segment with a plurality of curvatures of a second trajectory from a trajectory performance profile of the autonomous vehicle. The second trajectory is obtained by applying a plurality of linear and angular velocities to the autonomous vehicle on a test track. Further, the autonomous vehicle selects an optimal trajectory from the trajectory performance profile based on the matching and the current velocity and the present load of the autonomous vehicle. Further, the autonomous vehicle navigates along the optimal trajectory.

15 Claims, 8 Drawing Sheets

| VELOCITY PROFILE – VA1 | |
|---|---|
| APPLIED LINEAR VELOCITY IN m/sec | APPLIED ANGULAR VELOCITY IN deg/sec |
| 3 | 1 |
| 2.8 | 5 |
| 2.5 | 7 |
| 2.2 | 10 |
| 2.0 | 15 |
| 1.5 | 20 |
| 1.5 | 20 |
| 1.5 | 20 |
| 1.5 | 15 |
| 2.2 | 10 |
| 2.5 | 7 |
| 2.8 | 5 |
| 3 | 1 |

FIGURE 5A – TABLE 1

| | PICK-UP VELOCITY IN m/sec | APPLIED VELOCITY PROFILES |
|---|---|---|
| Set A | 3 | VA1, VA2, VA3, VA4 |
| Set B | 2.5 | VB1, VB2, VB3 |
| Set C | 2 | VC1 |
| Set D | 1.5 | VD1, VD2, VD3, VD4 |
| Set E | 1 | VE1, VE2, VE3 |

FIGURE 5B – TABLE 2

| Set A | Start Curvature followed in deg/sec | Peak Curvature followed in deg/sec | Maximum load in motor in Amperes | Average load in motor in Amperes | Duration of Max steering angle in sec |
|---|---|---|---|---|---|
| VA1 | 1 | 20 | 3 | 2 | 7 |
| VA2 | 3 | 25 | 3.5 | 2.2 | 5 |
| VA3 | 5 | 30 | 5 | 3 | 3 |
| VA4 | 10 | 35 | 5.7 | 3.7 | 1.6 |

FIGURE 6A - TABLE 3

METHOD AND DEVICE FOR NAVIGATING AN AUTONOMOUS VEHICLE

TECHNICAL FIELD

The present disclosure relates to the field of autonomous vehicle. Particularly, but not exclusively, the present disclosure relates to a method and device for navigating the autonomous vehicle.

BACKGROUND

Some vehicles are configured to operate in an autonomous mode in which the vehicles navigate through an environment with little or no input from a driver. Such an autonomous vehicle typically includes one or more sensors that are configured to sense information about the environment. The autonomous vehicle may use the sensed information to navigate through the environment. Over the period of time, need for such autonomous vehicles have been recognized in various industrial fields.

The autonomous vehicle performs a trajectory planning to navigate the vehicle for a path ahead. The trajectory planning determines the trajectory of the autonomous vehicle for the path ahead. The trajectory planning is a challenging task for navigating the autonomous vehicle in real time. Some of the existing methods perform trajectory planning with the help of an environment map, sensor perception of the environment combined with mechanical and electrical parameters associated with the autonomous vehicles.

An issue with the existing methods is that vehicle experience is not considered for trajectory planning. The experience includes for example the velocity to be applied for the autonomous vehicle, given the current load condition to complete the trajectory. Another issue with the existing methods is that the parameters used for navigating the autonomous vehicle does not consider the vehicle parameters for example, type or model of vehicle. As a result, accuracy of trajectory planning is not met and navigating the autonomous vehicle through such segments becomes complex.

The information disclosed in this background of the disclosure section is only for enhancement of understanding of the general background of the invention and should not be taken as an acknowledgement or any form of suggestion that this information forms the prior art already known to a person skilled in the art.

SUMMARY

One or more shortcomings of the prior art are overcome, and additional advantages are provided through the provision of method of the present disclosure.

Additional features and advantages are realized through the techniques of the present disclosure. Other embodiments and aspects of the disclosure are described in detail herein and are considered a part of the claimed disclosure.

Disclosed herein is a method of navigating an autonomous vehicle, the method includes generating, by a navigation unit, a first trajectory based on a path of navigation for the autonomous vehicle. Further, the method includes determining a current velocity and present load of the autonomous vehicle and measuring a curvature of a curved segment in the first trajectory. The method further includes matching the measured curvature of the curved segment with at least one of a curvature of a second trajectory from a trajectory performance profile of the autonomous vehicle. Thereafter, the method includes selecting an optimal trajectory from the trajectory performance profile based on the matching and the current velocity and the present load of the autonomous vehicle. Further, the method includes navigating autonomous vehicle along the optimal trajectory.

An embodiment disclosed here includes a navigation unit for navigating an autonomous vehicle. The navigation system includes a processor, and a memory communicatively coupled to the processor. Further, the memory stores processor instructions, which, on execution, causes the processor to generate, a first trajectory based on a path of navigation for the autonomous vehicle. Further, the processor is configured to determine, a current velocity and present load of the autonomous vehicle. Furthermore, the processor is configured to measure, a curvature of a curved segment in the first trajectory. Thereafter, the processor is configured to match, the measured curvature of the curved segment with at least one of a curvature of a second trajectory from a trajectory performance profile of the autonomous vehicle. Subsequently, the processor is configured to select, an optimal trajectory from the trajectory performance profile based on the matching and the current velocity and the present load of the autonomous vehicle. Finally, the processor is configured to navigate, the autonomous vehicle along the optimal trajectory.

Furthermore, the present disclosure includes a non-transitory computer readable medium including instructions stored thereon that when processed by at least one processor cause a device to perform generating a first trajectory based on a path of navigation for the autonomous vehicle. Further, the processor causes the device to perform determining a current velocity and present load of the autonomous vehicle. Furthermore, the processor causes the device to perform measuring a curvature of a curved segment in the first trajectory. Thereafter, the processor causes the device to perform matching the measured curvature of the curved segment with at least one of a curvature of a second trajectory from a trajectory performance profile of the autonomous vehicle. Subsequently, the processor causes the device to perform selecting an optimal trajectory from the trajectory performance profile based on the matching and the current velocity and the present load of the autonomous vehicle. Finally, the processor causes the device to perform navigating the autonomous vehicle along the optimal trajectory.

The foregoing summary is illustrative only and is not intended to be in any way limiting. In addition to the illustrative aspects, embodiments, and features described above, further aspects, embodiments, and features may become apparent by reference to the drawings and the following detailed description.

BRIEF DESCRIPTION OF THE ACCOMPANYING DRAWINGS

The novel features and characteristic of the disclosure are set forth in the appended claims. The disclosure itself, however, as well as a preferred mode of use, further objectives and advantages thereof, may best be understood by reference to the following detailed description of an illustrative embodiment when read in conjunction with the accompanying drawings. The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. One or more embodiments are now described, by way of example only, with reference to the accompanying figures wherein like reference numerals represent like elements and in which:

FIG. 5A shows an exemplary TABLE 1 comprising a velocity profile applied to an autonomous vehicle with the corresponding trajectory traversed, in accordance with an embodiment of the present disclosure;

FIG. 5B shows an exemplary TABLE 2 comprising a collection of the applied velocity profiles to an autonomous vehicle with different pick-up velocities, in accordance with an embodiment of the present disclosure;

FIG. 6A shows an exemplary TABLE 3 comprising the recorded autonomous vehicle parameters corresponding to an applied velocity profile, in accordance with an embodiment of the present disclosure;

Figure 1:
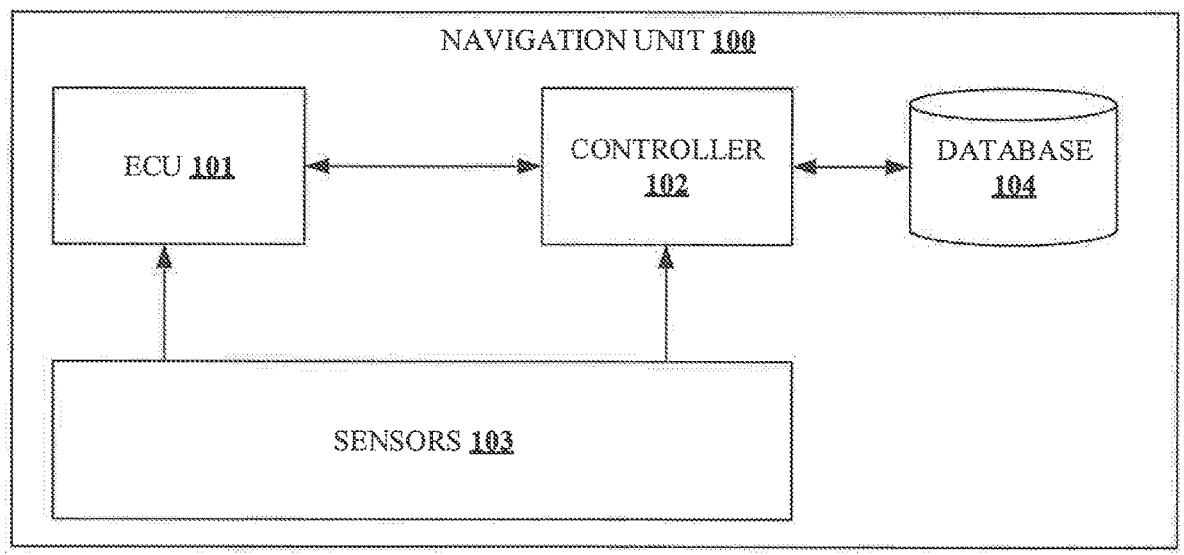
FIG. 1 shows an exemplary block diagram of a navigation unit to navigate an autonomous vehicle, in accordance with an embodiment of the present disclosure.

It should be appreciated by those skilled in the art that any block diagrams herein represent conceptual views of illustrative systems embodying the principles of the present subject matter. Similarly, it may be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and may be described in detail below. It should be understood, however that it is not intended to limit the disclosure to the particular forms disclosed, but on the contrary, the disclosure is to cover all modifications, equivalents, and alternative falling within the scope of the disclosure.

The terms "comprises", "includes" "comprising", "including" or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" or "includes . . . a" does not, without more constraints, preclude the existence of other elements or additional elements in the system or apparatus.

Embodiments of the present disclosure relates to a method and device for navigating an autonomous vehicle. The method comprises of splitting a path between a source location and a destination location into segments. Determining a current velocity and a load condition of the autonomous vehicle. Further, trajectories are generated and a curvature for each of the trajectories are measured. In an embodiment, the curvature for the trajectories are measured for the trajectories that are curves or non-linear. An optimal trajectory for the measured curvature of the curved segment is matched and selected from a trajectory performance profile stored in the database. Further, the autonomous vehicle is navigated along the optimal trajectory, also referred to as optimal curvature trajectory, by applying a velocity profile corresponding to the selected trajectory performance profile.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 shows an exemplary block diagram of a navigation unit to navigate an autonomous vehicle, in accordance with an embodiment of the present disclosure.

In some implementation, a navigation unit (100) includes an Electronic Control Unit (ECU) (101), a controller (102) and sensors (103). In an embodiment, the sensors (103) may be connected to the controller (102) and the ECU (101) through a wired or a wireless medium. The controller (102) and the ECU (101) receives various signals measured from the sensors (103). The controller (102) initiates trajectory planning for a segment and requests the ECU (101) for a velocity profile to be applied for navigating the autonomous vehicle. The ECU (101) of the navigation unit (100) may generate a first trajectory based on a path of navigation for the autonomous vehicle. In an embodiment the initial trajectory may be generated without considering the condition or experience of the autonomous vehicle. For example, the autonomous vehicle may be loaded with weight of 500 kgs and velocity of 100 kmph and the initial trajectory only considers the path ahead and not the load or velocity of the autonomous vehicle. The ECU (101) may determine a current velocity and the load condition of the autonomous vehicle. Further, the ECU (101) measures the curvature of the curved segment in the first trajectory and selects an optimal trajectory by matching the measured curvature of the curved segment, the current velocity and the load condition of the autonomous vehicle with at least one of a curvature of a second trajectory from a trajectory performance profile stored in a database (104). The trajectory performance profile comprises of a collection of velocity profiles, the curvature corresponding to the velocity profile, peak curvature traversed, peak load on the motor, average load on the motor, duration of peak steering angle, and a peak load duration of the autonomous vehicle. Further, a velocity profile corresponding to the optimal trajectory selected is retrieved form the database (104) based on the current velocity and the load condition such as 'present load' of the autonomous vehicle. The controller (102) signals the ECU (101) to apply the velocity profile corresponding to the optimal trajectory for navigating the vehicle in real time.

Figure 2:
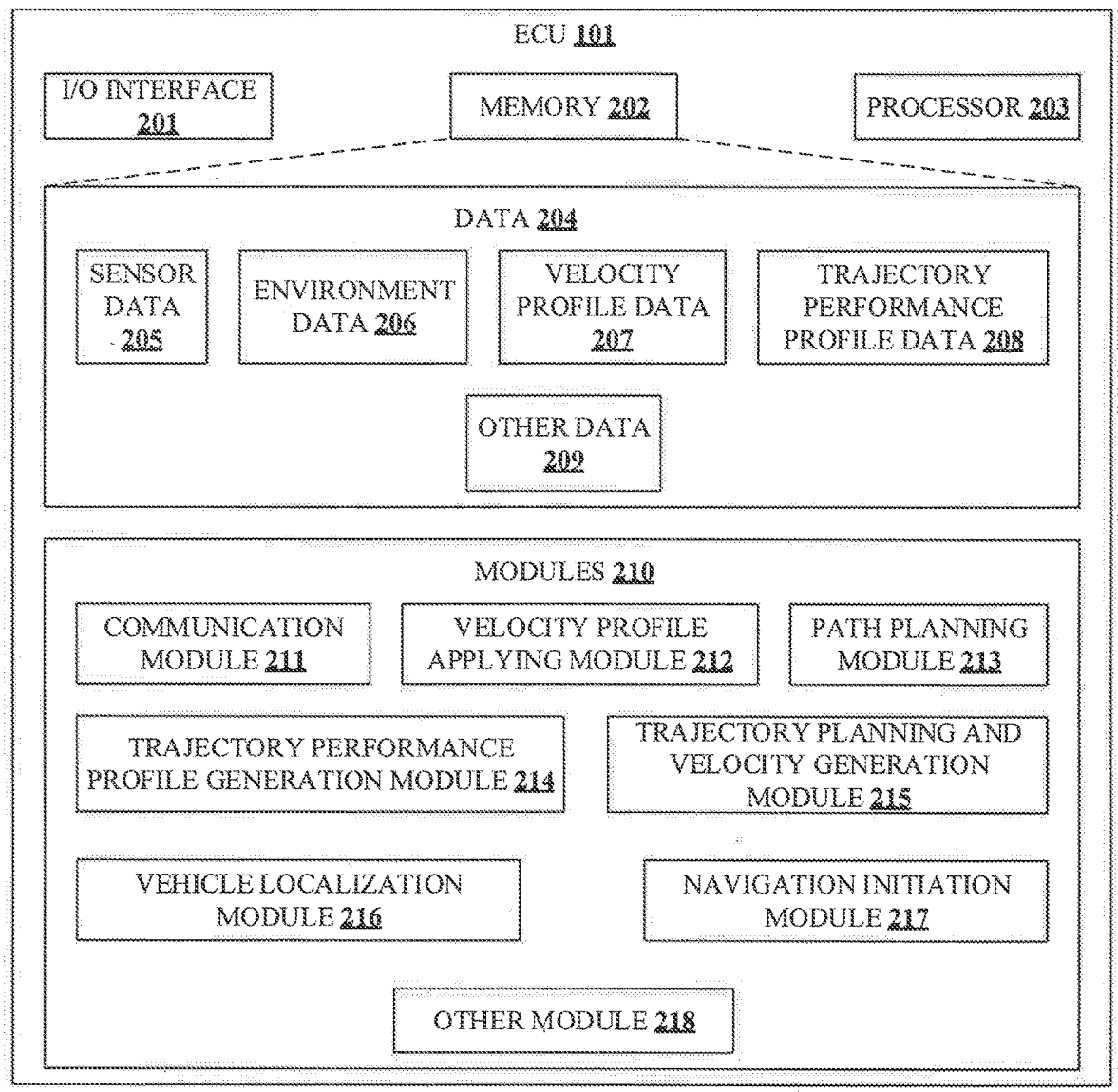
FIG. 2 shows a detailed block diagram of the ECU used to navigate an autonomous vehicle, in accordance with embodiments of the present disclosure.

FIG. 2 shows a detailed block diagram of the ECU (101) used to navigate an autonomous vehicle, in accordance with embodiments of the present disclosure.

The ECU (101) may include at least one Central Processing Unit ("CPU" or "processor") (203) and a memory (202) storing instructions executable by the at least one processor (203). The processor (203) may comprise at least one data processor for executing program components for executing user or system-generated requests. The memory (202) is communicatively coupled to the processor (203). The computing system (100) further comprises an Input/Output (I/O) interface (201). The I/O interface (201) is coupled with the processor (203) through which an input signal or/and an output signal is communicated.

In some implementations, the ECU (101) may include data (204) and modules (210). As an example, the data (204) is stored in the memory (202) configured in the ECU (101) as shown in the FIG. 2. In one embodiment, the data (204) may include, for example, sensor data (205), environment data (206), velocity profile data (207), trajectory performance profile data (208) and other data (209). In the illustrated FIG. 2, modules (210) are described herein in detail.

In some embodiments, data (204) may be stored in the memory (202) in form of various data structures. Additionally, the data (204) may be organized using data models, such as relational or hierarchical data models. The other data (209) may store data, including temporary data and temporary files, generated by the modules (210) for performing the various functions of the ECU (101).

In an embodiment, the sensor data (205) may include various signals measured from the autonomous vehicle for example a current velocity of the autonomous vehicle, load on the motors of the autonomous vehicle and steering angle of the autonomous vehicle and the like.

In an embodiment, the environment data (206) may include the map of an area such as a city, current position of the autonomous vehicle, the number of lanes on the road, current lane of the autonomous vehicle, height and weight of the autonomous vehicle and information about any obstacles identified on the road or path.

In an embodiment, the velocity profile data (207) may include a collection of different variations in linear and angular velocities applied to the autonomous vehicle.

In an embodiment, the trajectory performance profile data (208) may include the traversed curvature, peak velocity variation, peak radius of curvature traversed, peak load in the motor for the traversed curvature, average load in the motor for the traversed curvature and duration of peak steering angle.

In some embodiments, the data (204) stored in the memory (202) may be processed by the modules (210) of the ECU (101). The modules (210) may be stored within the memory (202). In an example, the modules (210) communicatively coupled to the processor (203) configured in the ECU (101), may also be present outside the memory (202) as shown in FIG. 2 and implemented as hardware. As used herein, the term modules (210) may refer to an application specific integrated circuit (ASIC), an electronic circuit, a processor (shared, dedicated, or group) and memory that execute one or more software or firmware programs, a combinational logic circuit, and/or other suitable components that provide the described functionality.

In one implementation, the modules (210) may include, for example, a communication module (211), a velocity profile applying module (212), a path planning module (213), a trajectory performance profile generation module (214), a trajectory planning and velocity generation module (215), a vehicle localization module (216), a navigation initiation module (217) and other module (218). It will be appreciated that such aforementioned modules (210) may be represented as a single module or a combination of different modules.

In an embodiment the navigation initiation module (217) comprises an audio-visual interface with a map. In the map a user will be able to see the current source location of the autonomous vehicle and the user may choose a destination location for navigating the autonomous vehicle. The path planning module (213) determines a path from the source location to the destination location and indicates to the navigation initiation module (217). In one embodiment, the path from the source location to the destination location is split into segments. Further the path planning module (213) generates a first trajectory for the segment ahead of the autonomous vehicle based on the current environment data (206), and the current velocity of the autonomous vehicle. The generated first trajectory is given to trajectory planning and velocity generation module (215) for determining the actual velocity to be applied for navigating the autonomous vehicle.

In an embodiment, trajectory planning and velocity generation module (215) computes multiple trajectory plans for navigating the path ahead. The multiple trajectory plans are planned by considering movement of vehicles proximal to the autonomous vehicle, the load condition of the autonomous vehicle and the current velocity of the autonomous vehicle. Further, curvature for each curved segment of a trajectory for each of the planned multiple trajectory plans is computed and highest curvature is matched with a curvature of a second trajectory from a trajectory performance profile of the autonomous vehicle. The trajectory planning and velocity generation module (215) selects a trajectory plan from the planned multiple trajectory plans based on a curvature matching closest to the curvature of the curved segment of the first trajectory and the curvature that may cause less stress or less load to the motors associated with the autonomous vehicle by selecting the optimal trajectory based on the current velocity and present load or current load of the autonomous vehicle. In some embodiments, selecting the optimal trajectory is based on at least one of the current peak steering angle, current peak load to the motor of the autonomous vehicle, current average load to the motor and current peak load duration. Further, trajectory planning and velocity generation module (215) may generate a realistic velocity based on previous velocity of the autonomous vehicle and the projected velocity based on the selected optimal trajectory. The projected velocity is a velocity profile corresponding to the selected optimal trajectory which may be retrieved from the trajectory performance profile.

In an embodiment, the vehicle localization module (216) determines the current location of the vehicle based on velocity of the vehicle. Based on a new position of the vehicle as determined by the vehicle localization module (216) a new trajectory plan is calculated. In an example, the vehicle localization module (216) may collect data of wheel-base feedback, environmental map, and current lidar observation points. Based on these data the vehicle localization module (216) continuously localizes the vehicle position on the map. The vehicle localization module (216) may indicate the position of the autonomous vehicle on map while navigating. Further global path planning or trajectory planning start from the position of the autonomous vehicle as indicated on the map.

In an embodiment, a communication module (211) is used to accept a destination location from the user using an audio-visual interface which is used for planning the path from the current location to the destination location. Further, it is also used to send and receive data from the database 104.

In an embodiment, a trajectory performance profile generation module (214) is used to compute the curvature traversed by the autonomous vehicle, measure the duration of peak steering angle and various parameters of the autonomous vehicle like peak curvature traversed, peak load in the motors and the average load in the motors.

In an embodiment, other modules (218) may include, but is not limited to user interface module, a notification module. The user interface module may comprise of an audio-visual interface to interact with the user and receive inputs from the user for navigating the autonomous vehicle.

In an embodiment, the trajectory planning and generating the realistic velocity as explained above is repeatedly performed by the navigating unit (100) at a predefined regular interval for example 100 ms.

Figure 3:
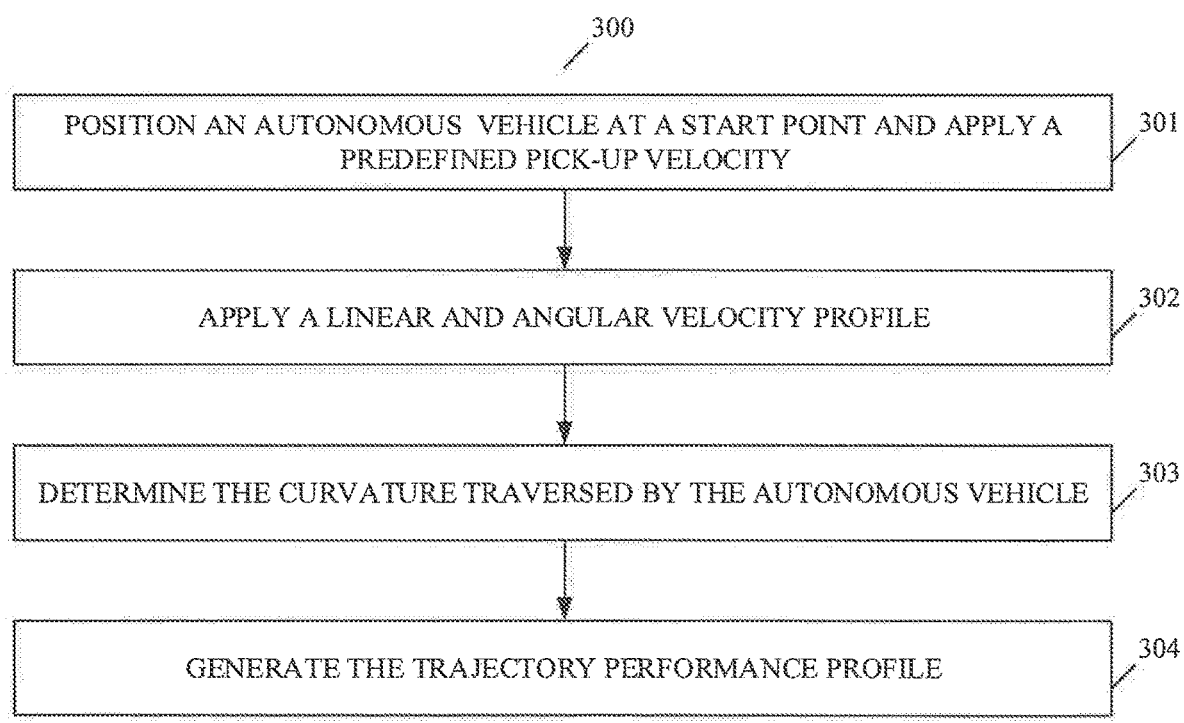
FIG. 3 shows a flow chart illustrating method steps to generate a trajectory performance profile for an autonomous vehicle, in accordance with an embodiment of the present disclosure.

FIG. 3 shows a flow chart illustrating method steps to generate a trajectory performance profile for an autonomous vehicle, in accordance with an embodiment of the present disclosure.

The order in which the method 300 is described is not intended to be construed as a limitation, and any number of the described method blocks may be combined in any order to implement the method. Additionally, individual blocks may be deleted from the methods without departing from the spirit and scope of the subject matter described herein. Furthermore, the method may be implemented in any suitable hardware, software, firmware, or combination thereof.

Figure 4:
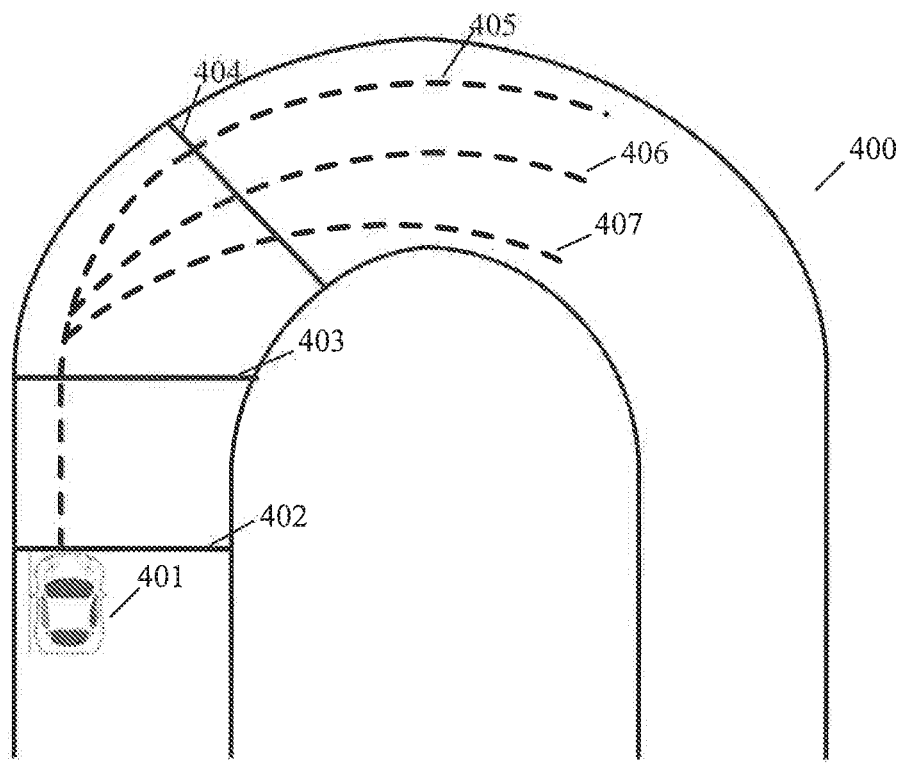
FIG. 4 shows an exemplary representation of different trajectories followed by an autonomous vehicle upon applying different velocity profiles on a test track, in accordance with an embodiment of the present disclosure.

As illustrated in FIG. 3, the method 300 may comprise one or more steps to generate a trajectory performance profile for the autonomous vehicle. To generate the trajectory performance profile for the autonomous vehicle a test track or a test field emulating different types of turns and curvatures with varying lanes is used. As shown in FIG. 4 an exemplary test track (400) comprising a curved segment for generating the trajectory performance profile of the autonomous vehicle. At the step 301 the autonomous vehicle (401) under test is placed at a start point (402). Further, the autonomous vehicle (401) is accelerated to reach a predefined pick-up velocity for example 3 m/sec with in a predefined distance called the initial position (403).

At the step 302, a variation in the linear and angular velocities is applied to the autonomous vehicle. An exemplary variation in the applied linear velocity to the autonomous vehicle from the initial position (403) is shown in the column 1 of the TABLE-1 in FIG. 5A. An exemplary variation in the applied angular velocity to the autonomous vehicle from the initial position (403) is shown in the column 2 of TABLE-1 in FIG. 5A. The TABLE-1 in FIG. 5A is denoted as the velocity profile VA1. The applied combination of linear and angular velocity to the autonomous vehicle in general is denoted as: $V_i = V_{iL} + j*V_{iA}$ Wherein, $V_i$ denotes the total velocity i.e. a combination of linear and angular velocity applied to the autonomous vehicle. The "j" represents a unit imaginary number. The total velocity $V_i$ in general is represented as a complex number for example consider the second row of TABLE-1 in FIGURE-5A then the applied velocity may be $V_2 = 2.8 + j*5$, the subscript "i" denotes the instance of the applied velocity $V_i$ to the autonomous vehicle, $V_{iL}$ denotes the linear velocity applied to the autonomous vehicle at the instance "i" and $V_{iA}$ denotes the angular velocity applied to the autonomous vehicle at the instance "i".

Figure 6B:
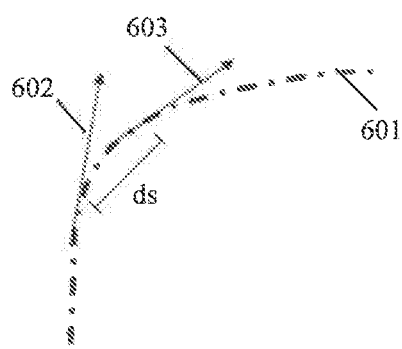
FIG. 6B shows an exemplary computation of the trajectory traversed by an autonomous vehicle corresponding to an applied velocity, in accordance with an embodiment of the present disclosure.
Figure 6C:
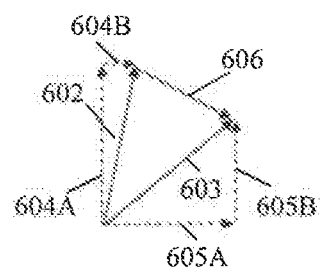
FIG. 6C shows an exemplary computation of change in applied velocity to an autonomous vehicle, in accordance with an embodiment of the present disclosure.

At the step 303, the curvature traversed by the autonomous vehicle upon application of a velocity profile is determined and recorded. The variation in the linear and angular velocities is applied to the autonomous vehicle starting from the initial position (403) at a fixed interval. The autonomous vehicle depending on the velocity profile applied for example VA1, VA2, VA3 and the like, may traverse different curvatures (405, 406, 407) denoted as a second trajectory as shown in FIG. 4. The curvature traversed by the autonomous vehicle is determined by computing the inverse ratio of peak change in the applied velocity to the distance covered during that change along the trajectory or the path. For an exemplary trajectory (601) is shown in FIG. 6B, the process described below is adopted for determining the curvature. Let the total velocity applied to the autonomous vehicle at an instance be $V_1$ (602), wherein $V_1 = V_{1L} + j*V_{1A}$ and the total velocity applied to the autonomous vehicle at the next instance be $V_2$ (603), wherein $V_2 = V_{2L} + j*V_{2A}$. Further, let "ds" denote the distance traveled by the autonomous vehicle along the path or the trajectory (601). The change in the total velocity applied to the autonomous vehicle be denoted as "dv", wherein "dv" is computed as $V_2 - V_1$ i.e. $(V_{2L} - V_{1L}) + j*(V_{2A} - V_{1A})$. An exemplary computation of "dv" is shown in FIG. 6C for the applied total velocities $V_1$ (602) and $V_2$ (603). The applied velocity $V_1$ (602) includes a linear velocity $V_{1L}$ (604A) and the angular velocity $V_{1A}$ (604B) and the applied velocity $V_2$ (603) includes a linear velocity $V_{2L}$ (605A) and the angular velocity $V_{2A}$ (605B). The change in the total velocity applied to the autonomous vehicle "dv" (606) is computed as $V_2 - V_1$. Further, the curvature traversed by the autonomous vehicle is computed as $$\frac{ds}{dv}.$$

In an embodiment, a collection of linear and angular velocity profiles for example VA1, VA2, VA3, VA4 as shown in the TABLE-2 of FIG. 5B is applied to the autonomous vehicle and a corresponding curvature traversed along the trajectories are determined. A collection of linear and angular velocity profiles applied to the autonomous vehicle with a same predefined pick-up velocity is denoted as SET A as shown in the TABLE-2 of FIG. 5B. Further the steps 301 to 303 as described above is performed for different pick-up velocities for example 2.5 m/sec, 2 m/sec and the like, generating SET B, SET C and the like. Also, the steps 301 to 303 is performed by placing the autonomous vehicle (401) at different start points (402).

At the step 304 a trajectory performance profile is generated and stored in a database (104) which is used to find the optimal trajectory and the corresponding velocity profile to traverse a first trajectory and navigate the autonomous vehicle in real time. The position of the autonomous vehicle at each instance on the curvature is determined and recorded as indicated at the step 303 for the entire trajectory traversed. Further a peak radius of curvature traversed by the autonomous vehicle for each curvature is calculated and recorded during the application of peak velocity variation. For example, consider the velocity profile VA1 is applied to the autonomous vehicle, a peak curvature may be calculated upon applying a velocity change from 2.0 m/s to 1.5 m/s and angular velocity changed from 15 deg/sec to 20 deg/sec. Further, as an example, as shown in TABLE-3 of FIG. 6A a peak load in the motor, an average load in the motor, duration of peak steering angle, duration of the peak vehicle load, the lane information of the vehicle at the initial position (403) is recorded for the corresponding velocity profile. All the aforesaid parameters constitute the trajectory performance profile of the autonomous vehicle. Further, the trajectory performance profile is stored in the database (104) and used by the autonomous vehicle to determine the optimal trajectory for navigating the vehicle in real time. A person skilled in the art would understand that, any other parameters associated with the autonomous vehicle, not mentioned explicitly, may also be used to generate trajectory performance profile in the present disclosure.

Figure 7:
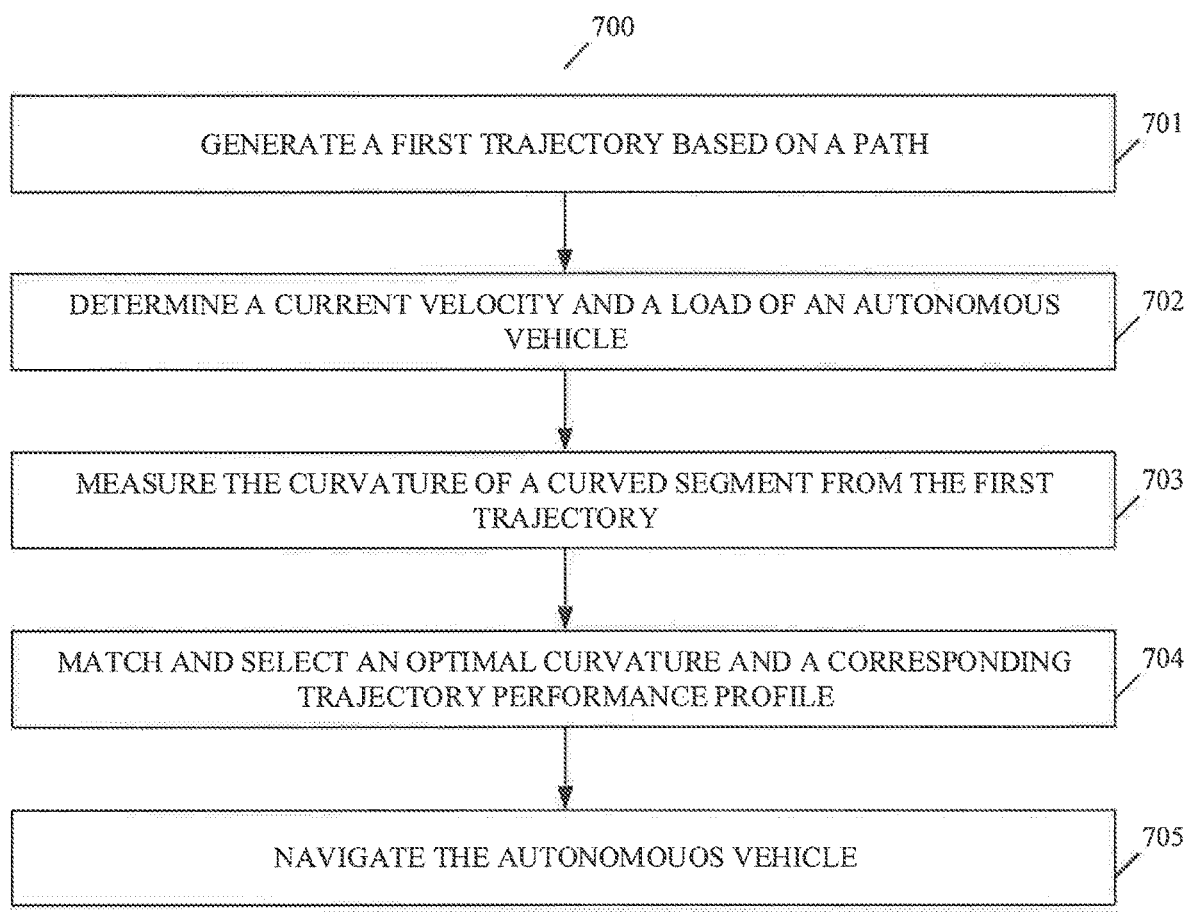
FIG. 7 shows a flow chart illustrating method steps to navigate an autonomous vehicle in real time, in accordance with embodiment of the present disclosure.

FIG. 7 shows a flow chart illustrating method steps to navigate an autonomous vehicle in real time, in accordance with embodiments of the present disclosure.

The order in which the method 700 is described is not intended to be construed as a limitation, and any number of the described method blocks may be combined in any order to implement the method. Additionally, individual blocks may be deleted from the methods without departing from the spirit and scope of the subject matter described herein. Furthermore, the method may be implemented in any suitable hardware, software, firmware, or combination thereof.

Figure 8A:
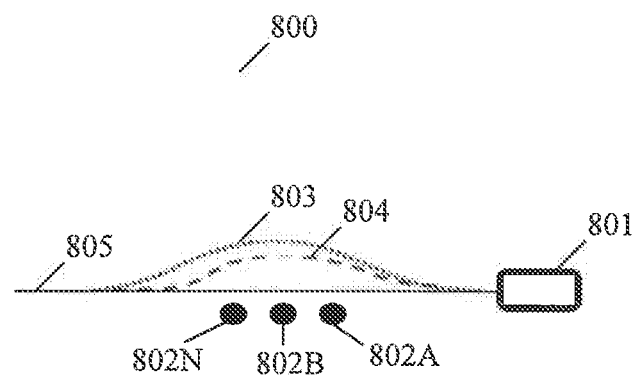
FIGS. 8A-8C show an exemplary scenario of navigating the autonomous vehicle in real time, in accordance with an embodiment of the present disclosure.

As illustrated in FIG. 7, the method 700 may comprise one or more steps for navigating an autonomous vehicle in real time. At the step 701 a first trajectory is generated for any given segment based on a path of navigation for the autonomous vehicle. The navigation unit (100) generates a first trajectory including multiple trajectory plans for traversing the curved segment. An example as shown in FIG. 8A, illustrates the autonomous vehicle 801 travelling along the road or the path 805 and detects obstacles (802A, 802B, 802N) along the path or the road 805. Further, the navigation unit (100) of the autonomous vehicle generates multiple trajectory plans (803, 804) for traversing the segment.

At the step 702 the current velocity of the autonomous vehicle and the current load condition of the autonomous vehicle is determined using the signals from the sensors (103). The current velocity of the autonomous vehicle is used to extract the velocity profiles from the trajectory performance profile having a pick-up velocity closer to the current velocity. Further the extracted velocity profiles are used to match and select a one or more optimal velocities corresponding to the second trajectory stored in the trajectory performance profile. The one or more optimal velocities corresponds to the velocity profile of the selected optimal trajectory stored in the trajectory performance profile. In some embodiments, the extracted velocity profiles are used to match and select a one or more optimal velocities based on the highest curvature on a particular trajectory it has to traverse.

Figure 8B:
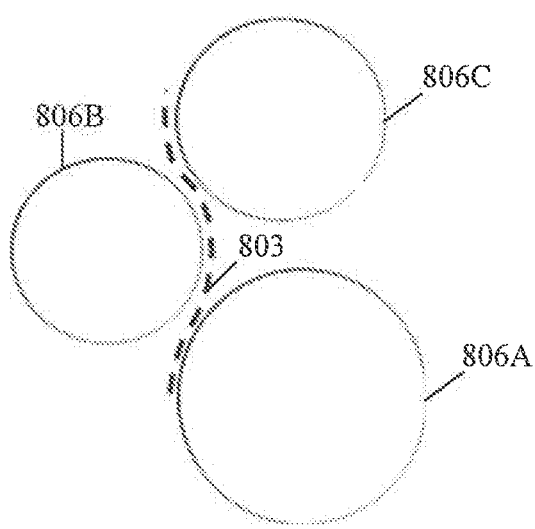

At the step 703 the curvature of a trajectory is computed for the all the trajectory plans generated at the step 701. In some embodiments, a trajectory plan for traversing may include multiple curved sections. The navigation unit (100) computes all the curvatures present along the trajectory plan one after the other. The curvature is computed by determining the tangents at the start and the end points of the circle along a turn and then a perpendicular to the tangents at the start and end portion of circle along the turn is determined. The center of circle is determined at the intersection of perpendicular. Further the curvature of the turn is computed as the inverse of the determined radius. An example as shown in FIG. 8B, choosing one trajectory plan (803) among the multiple trajectory plans (803,804), a navigating unit (100) identifies all the turns present along the trajectory plan and a circle (806A, 806B, 806C) is assumed along the portion of the turn with the highest turn radius. Further, to compute the curvature of the circle portion along the turn consider a circle (806B) as shown in the FIG. 8C, the tangents (807A, 807B) is determined at the start and the end portion of circle along the turn. Further, the perpendiculars (808A, 808B) are determined corresponding to the tangents (807A, 807B) and the intersection of the perpendiculars gives the center of the circle (806B). The curvature (803) of the turn is computed by determining the inverse of the radius of the circle (806B). The same is done for all the curvatures present in a chosen trajectory plan.

Figure 8C:
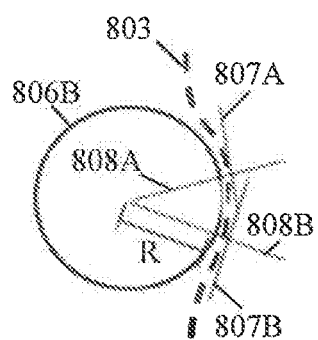

At the step 704 the highest curvatures computed for each of the trajectory plans at the step 703 along with the determined current velocity and the present load of the autonomous vehicle at the step 702 is matched with the second trajectory from the trajectory performance profile stored in the database (104). Further, an optimal trajectory may be selected by choosing the closest matching curvature, initial velocity, pick velocity and like from the trajectory performance profile nearest to one of the trajectory plans with highest computed curvatures and initial velocity of actual vehicle. Further, the matching may be done by computing a root mean square of deviation of all the performance measuring properties of the trajectory. For example, as shown in FIG. 8A-8C the highest curvatures computed for each of the trajectory plans (803,804) may be matched with the second trajectory stored in the trajectory performance profile and an optimal trajectory plan with the closest matching curvature to the highest curvatures computed for each of the trajectory plans (803,804) may be selected.

At the step 705, a velocity profile corresponding to the selected optimal trajectory from the trajectory performance profile and the velocity of the autonomous vehicle at a previous instant may be used to determine a realistic velocity. The determined realistic velocity is applied to the autonomous vehicle for navigating along the curvature. As an example, let a velocity profile VA1 as shown in TABLE 1 of FIG. 5A be the velocity profile corresponding to the selected optimal trajectory from the trajectory performance profile and let the velocity of the autonomous vehicle at the previous instant be 3.2 m/sec. Further, a realistic velocity may be generated as an average of the velocity of the autonomous vehicle at the previous instant and a velocity from the velocity profile corresponding to the selected optimal trajectory. Therefore, the average of the previous instant velocity of 3.2 m/sec and the velocity in the first row from the velocity profile VA1 as shown in TABLE 1 of FIG.

5A of 3 m/sec is averaged and a realistic velocity of 3.1 m/sec may be applied to the autonomous vehicle.

The steps 701 to 705 is done at a predefined regular interval of time for example 100 ms.

Computer System

Figure 9:
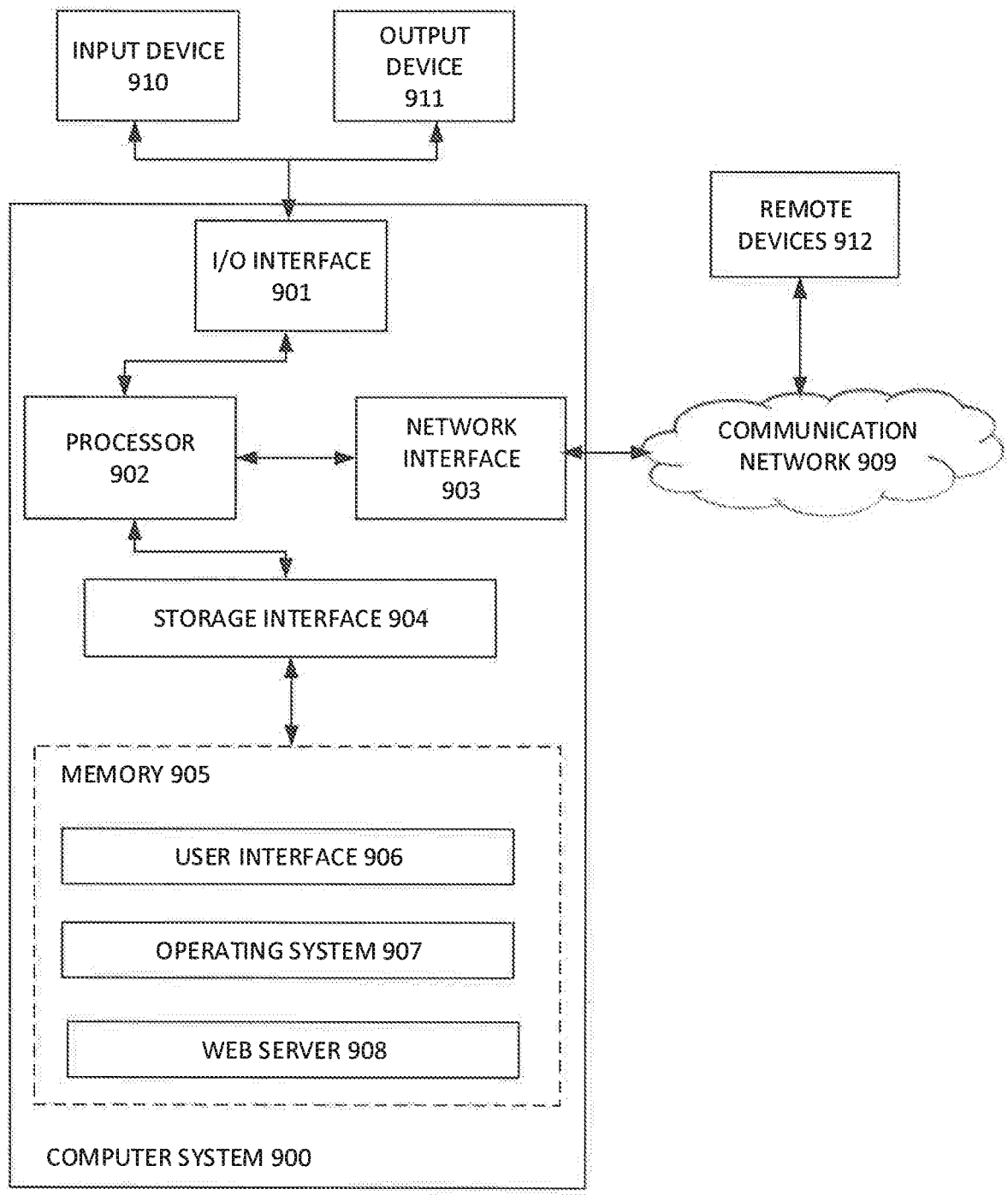
FIG. 9 shows a general-purpose computer system to navigate an autonomous vehicle, in accordance with embodiments of the present disclosure.

FIG. 9 illustrates a block diagram of an exemplary computer system (900) for implementing embodiments consistent with the present disclosure. In an embodiment, the computer system (900) may be used to implement the method for navigating an autonomous vehicle. The computer system (900) may comprise a central processing unit ("CPU" or "processor") (902). The processor (902) may comprise at least one data processor for executing program components for dynamic resource allocation at run time. The processor (902) may include specialized processing units such as integrated system (bus) controllers, memory management control units, floating point units, graphics processing units, digital signal processing units, etc.

The processor (902) may be disposed in communication with one or more input/output (I/O) devices (not shown) via I/O interface (901). The I/O interface (901) may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface (901), the computer system (900) may communicate with one or more I/O devices. For example, the input device (910) may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device (911) may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system (900) is connected to the service operator through a communication network (909). The processor (902) may be disposed in communication with the communication network (909) via a network interface (903). The network interface (903) may communicate with the communication network (909). The network interface (903) may employ connection protocols including, without limitation, direct connect, Ethernet (e.g., twisted pair 10/100/1000 Base T), transmission control protocol/Internet protocol (TCP/IP), token ring, IEEE 802.11a/b/g/n/x, etc. The communication network (909) may include, without limitation, a direct interconnection, e-commerce network, a peer to peer (P2P) network, local area network (LAN), wide area network (WAN), wireless network (e.g., using Wireless Application Protocol), the Internet, Wi-Fi, etc. Using the network interface (903) and the communication network (909), the computer system (900) may communicate with the one or more service operators.

In some embodiments, the processor (902) may be disposed in communication with a memory (905) (e.g., RAM, ROM, etc. not shown in FIG. 9 via a storage interface (904). The storage interface (904) may connect to memory (905) including, without limitation, memory drives, removable disc drives, etc., employing connection protocols such as serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory (905) may store a collection of program or database components, including, without limitation, user interface (906), an operating system (907), web server (908) etc. In some embodiments, computer system (900) may store user/application data (906), such as the data, variables, records, etc. as described in this disclosure. Such databases may be implemented as fault-tolerant, relational, scalable, secure databases such as Oracle or Sybase.

The operating system (907) may facilitate resource management and operation of the computer system (900). Examples of operating systems include, without limitation, APPLE® MACINTOSH® OS X®, UNIX®, UNIX-like system distributions (E.G., BERKELEY SOFTWARE DISTRIBUTION® (BSD), FREEBSD®, NETBSD®, OPENBSD, etc.), LINUX® DISTRIBUTIONS (E.G., RED HAT®, UBUNTU®, KUBUNTU®, etc.), IBM®OS/2®, MICROSOFT® WINDOWS® (XP®, VISTA®/7/8, 10 etc.), APPLE® IOS®, GOOGLE™ ANDROID™, BLACKBERRY® OS, or the like.

In some embodiments, the computer system (900) may implement a web browser (908) stored program component. The web browser (908) may be a hypertext viewing application, such as MICROSOFT® INTERNET EXPLORER®, GOOGLE™ CHROME™, MOZILLA® FIREFOX®, APPLE® SAFARI®, etc. Secure web browsing may be provided using Secure Hypertext Transport Protocol (HTTPS), Secure Sockets Layer (SSL), Transport Layer Security (TLS), etc. Web browsers (908) may utilize facilities such as AJAX, DHTML, ADOBE® FLASH®, JAVASCRIPT®, JAVA®, Application Programming Interfaces (APIs), etc. In some embodiments, the computer system (900) may implement a mail server stored program component. The mail server may be an Internet mail server such as Microsoft Exchange, or the like. The mail server may utilize facilities such as Active Server Pages (ASP), ACTIVEX®, ANSI® C++/C #, MICROSOFT®, .NET, CGI SCRIPTS, JAVA®, JAVASCRIPT®, PERL®, PHP, PYTHON®, WEBOBJECTS®, etc. The mail server may utilize communication protocols such as Internet Message Access Protocol (IMAP), Messaging Application Programming Interface (MAPI), MICROSOFT® Exchange, Post Office Protocol (POP), Simple Mail Transfer Protocol (SMTP), or the like. In some embodiments, the computer system (900) may implement a mail client stored program component. The mail client may be a mail viewing application, such as APPLE® MAIL, MICROSOFT® ENTOURAGE®, MICROSOFT® OUTLOOK®, MOZILLA® THUNDERBIRD®, etc.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, non-volatile memory, hard drives, Compact Disc (CD) ROMs, Digital Video Disc (DVDs), flash drives, disks, and any other known physical storage media.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it may be readily apparent that more than one device/article (whether or not they cooperate) may be used in place of a single device/article. Similarly, where more than one device or article is described herein (whether or not they cooperate), it may be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 3 and FIG. 7 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Thus, navigating the autonomous vehicle provides a comprehensive guidance for determining a right trajectory for autonomous vehicle by considering the vehicle model and current state of the autonomous vehicle. Therefore, the autonomous vehicle may navigate with a better mechanical and electrical suitability for a given environment scenario. The trajectory performance profile data used to select the optimal trajectory is generated corresponding to the model of the autonomous vehicle. The selection of the optimal trajectory may be done based on the current velocity and the load of the autonomous vehicle.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments may be apparent to those skilled in the art. The various aspects and embodiments disclosed herein are for purposes of illustration and are not intended to be limiting, with the true scope and spirit being indicated by the following claims.

REFERRAL NUMERALS

| Reference number | Description |
| --- | --- |
| 100 | Navigation Unit |
| 101 | Electronic Control Unit (ECU) |
| 102 | Controller |
| 103 | Sensors |
| 201 | I/O interface |
| 202 | Memory |
| 203 | Processor |
| 204 | Data |
| 205 | Sensor data |
| 206 | Environment data |
| 207 | Velocity Profile data |
| 208 | Trajectory performance profile data |
| 209 | Other Data |
| 210 | Modules |
| 211 | Communication Module |
| 212 | Velocity Profile Applying Module |
| 213 | Path Planning Module |
| 214 | Trajectory Performance Profile Generation Module |
| 215 | Trajectory Planning and Velocity Generation Module |
| 216 | Vehicle Localization Module |
| 217 | Navigation Initiation Module |
| 218 | Other Modules |
| 400 | Exemplary test track |
| 401 | Autonomous Vehicle |
| 402 | Start Point |
| 403 | Initial Position |
| 404 | Finish Line |
| 405 | Curvature Trajectory |
| 406 | Curvature Trajectory |
| 407 | Curvature Trajectory |
| 601 | Trajectory |
| 602 | Total Velocity $V_1$ |
| 603 | Total Velocity $V_2$ |
| 900 | Computer System |
| 901 | I/O interface |
| 902 | Processor |
| 903 | Network Interface |
| 904 | Storage Interface |
| 905 | Memory |
| 906 | User Interface |
| 907 | Operating System |
| 908 | Web Server |
| 909 | Communication Network |
| 910 | Input Device |
| 911 | Output Device |
| 912 | Remote Devices |

What is claimed is:

1. A method of navigating an autonomous vehicle, the method comprising:

generating, by a navigation unit, a first trajectory based on a path of navigation for the autonomous vehicle;

determining, by the navigation unit, a current velocity and present load of the autonomous vehicle;

measuring, by the navigation unit, a curvature of a curved segment in the first trajectory;

matching, by the navigation unit, the measured curvature of the curved segment with at least one of a curvature of a second trajectory from a trajectory performance profile of the autonomous vehicle, wherein the trajectory performance profile of the autonomous vehicle is generated based on:
  applying to the autonomous vehicle, after attaining a predefined pick-up velocity, a combination of a plurality of linear velocities and a plurality of angular velocities corresponding to the predefined pick-up velocity; and
  determining a curvature of the second trajectory traversed by the autonomous vehicle corresponding to each combination of the plurality of linear velocities, the plurality of angular velocities, and the predefined pick-up velocity;
selecting, by the navigation unit, an optimal trajectory from the trajectory performance profile based on the matching and the current velocity and the present load of the autonomous vehicle; and
navigating, by the navigation unit, the autonomous vehicle along the optimal trajectory.

2. The method of claim 1, wherein the curvature of the curved segment in the first trajectory is the highest curvature in the first trajectory.

3. The method of claim 1, wherein the trajectory performance profile is generated further based on measurement of at least one of duration of peak steering angle of the autonomous vehicle, a peak load to a motor of the autonomous vehicle, an average load to the motor and a peak load duration of the autonomous vehicle, upon applying the plurality of linear and angular velocities after attaining the predefined pick-up velocity by the autonomous vehicle.

4. The method of claim 1, wherein selecting the optimal trajectory is based on at least one of the current load, current peak steering angle, current peak load to the motor of the autonomous vehicle, current average load to the motor and current peak load duration.

5. The method of claim 1, wherein navigation of the autonomous vehicle comprises applying one or more optimal velocities to the autonomous vehicle based on the optimal trajectory.

6. A navigation unit for navigating an autonomous vehicle comprising:
  a processor, and
  a memory communicatively coupled to the processor, wherein the memory stores instructions, which, on execution by the processor, causes the processor to:
    generate a first trajectory based on a path of navigation for the autonomous vehicle;
    determine a current velocity and present load of the autonomous vehicle;
    measure a curvature of a curved segment in the first trajectory;
    match the measured curvature of the curved segment with at least one of a curvature of a second trajectory from a trajectory performance profile of the autonomous vehicle, wherein the trajectory performance profile of the autonomous vehicle is generated based on:
      applying to the autonomous vehicle, after attaining a predefined pick-up velocity, a combination of a plurality of linear velocities and a plurality of angular velocities corresponding to the predefined pick-up velocity; and
      determining a curvature of the second trajectory traversed by the autonomous vehicle corresponding to each combination of the plurality of linear velocities, the plurality of angular velocities, and the predefined pick-up velocity;
    select an optimal trajectory from the trajectory performance profile based on the matching and the current velocity and the present load of the autonomous vehicle; and
    navigate the autonomous vehicle along the optimal trajectory.

7. The navigation unit of claim 6, wherein the curvature of the curved segment in the first trajectory is the highest curvature in the first trajectory.

8. The navigation unit of claim 6, wherein the instructions, on execution by the processor, cause the processor to generate the trajectory performance profile further based on measurement of at least one of duration of peak steering angle of the autonomous vehicle, a peak load to a motor of the autonomous vehicle, an average load to the motor and a peak load duration of the autonomous vehicle, upon applying the plurality of linear and angular velocities after attaining the predefined pick-up velocity by the autonomous vehicle.

9. The navigation unit of claim 6, wherein the instructions, on execution by the processor, cause the processor to select the optimal trajectory based on at least one of the current load, current peak steering angle, current peak load to the motor of the autonomous vehicle, current average load to the motor and current peak load duration.

10. The navigation unit of claim 6, wherein the instructions, on execution by the processor, cause the processor to navigate the autonomous vehicle comprises applying one or more optimal velocities to the autonomous vehicle based on the optimal trajectory.

11. A non-transitory computer readable medium including instructions stored thereon for navigating an autonomous vehicle that when processed by at least one processor cause a device to perform operations comprising:
  generating a first trajectory based on a path of navigation for the autonomous vehicle;
  determining a current velocity and present load of the autonomous vehicle;
  measuring a curvature of a curved segment in the first trajectory;
  matching the measured curvature of the curved segment with at least one of a curvature of a second trajectory from a trajectory performance profile of the autonomous vehicle, wherein the trajectory performance profile of the autonomous vehicle is generated based on:
    applying to the autonomous vehicle, after attaining a predefined pick-up velocity, a combination of a plurality of linear velocities and a plurality of angular velocities corresponding to the predefined pick-up velocity; and
    determining a curvature of the second trajectory traversed by the autonomous vehicle corresponding to each combination of the plurality of linear velocities, the plurality of angular velocities, and the predefined pick-up velocity;
  selecting an optimal trajectory from the trajectory performance profile based on the matching and the current velocity and the present load of the autonomous vehicle; and
  navigating the autonomous vehicle along the optimal trajectory.

12. The medium of claim 11, wherein the curvature of the curved segment in the first trajectory is the highest curvature in the first trajectory.

13. The medium of claim 11, wherein the processor causes the device to generate the trajectory performance profile further based on measurement of at least one of duration of peak steering angle of the autonomous vehicle, a peak load to a motor of the autonomous vehicle, an average load to the motor and a peak load duration of the autonomous vehicle, upon applying the plurality of linear and angular velocities after attaining the predefined pick-up velocity by the autonomous vehicle.

14. The medium of claim 11, wherein the processor causes the device to select the optimal trajectory based on at least one of the current load, current peak steering angle, current peak load to the motor of the autonomous vehicle, current average load to the motor and current peak load duration.

15. The medium of claim 11, wherein the processor causes the device to navigate the autonomous vehicle comprises applying one or more optimal velocities to the autonomous vehicle based on the optimal trajectory.

* * * * *